US006073778A

United States Patent [19]

Dudley

[11] Patent Number: 6,073,778

[45] Date of Patent: Jun. 13, 2000

[54] WRINGER BOWL ASSEMBLY

[76] Inventor: Robert H. Dudley, 1333 Essex Cir., Kalamazoo, Mich. 49008

[21] Appl. No.: 09/228,473

[22] Filed: Jan. 11, 1999

Related U.S. Application Data

[63] Continuation-in-part of application No. 08/840,478, Apr. 21, 1997, Pat. No. 5,858,236.

[51] Int. Cl.[7] .......................... B01D 33/00; B01D 29/56

[52] U.S. Cl. .......................... 210/499; 210/232; 210/348; 210/360.1; 210/373; 210/380.1; 494/36

[58] Field of Search .......................... 210/232, 348, 210/360.1, 373, 380.1, 409, 499; 494/36

[56] References Cited

U.S. PATENT DOCUMENTS

| | | | |
|---|---|---|---|
| 3,491,888 | 1/1970 | Colburn et al. | 210/380 |
| 4,253,960 | 3/1981 | Dudley et al. | 210/373 |
| 4,512,880 | 4/1985 | Connolly | 210/409 |
| 5,242,583 | 9/1993 | Thomas | 210/161 |
| 5,476,588 | 12/1995 | Nagaoka | 210/499 |
| 5,558,770 | 9/1996 | Cope et al. | 210/374 |

*Primary Examiner*—David A. Reifsnyder
*Attorney, Agent, or Firm*—Bliss McGlynn, P.C.

[57] ABSTRACT

A wringer bowl assembly is fabricated from a base plate, a top plate, and at least one side face extending therebetween. The side face includes an output hole which is where a fluid mixture is separated into its fluid and solid components. Screen units extend across the output holes to prevent the solid component of the fluid mixture from passing therethrough. Each of the screen units extends through a curved path over a portion of the circumference of the wringer bowl.

1 Claim, 3 Drawing Sheets

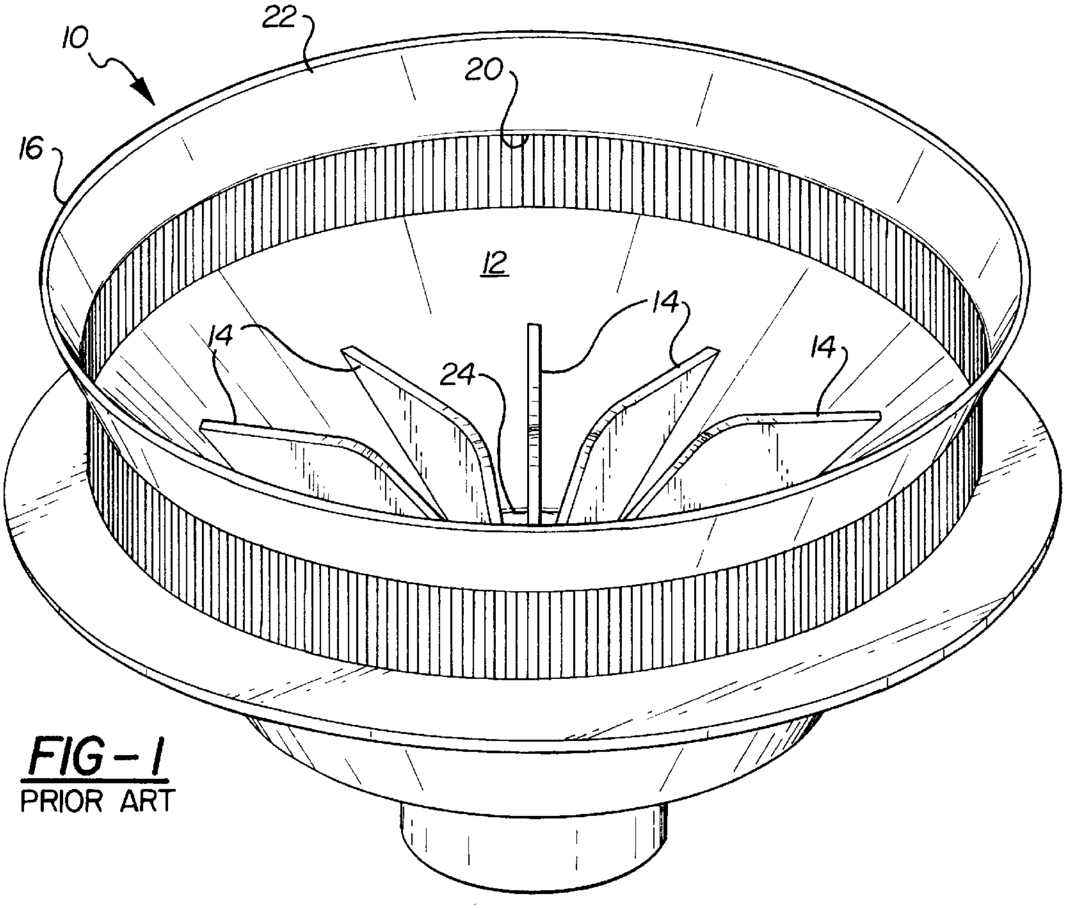
FIG-1
PRIOR ART
FIG-3
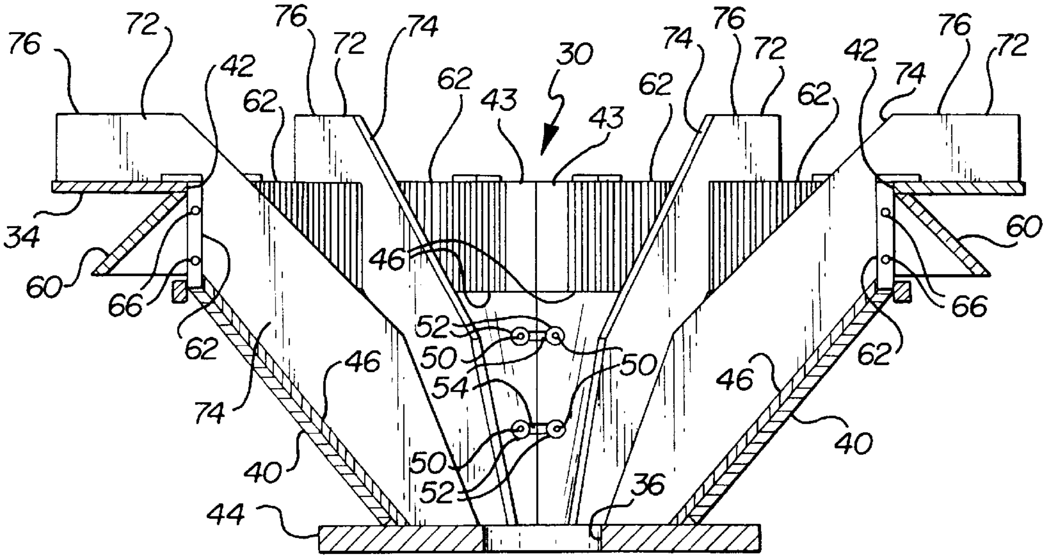

WRINGER BOWL ASSEMBLY

This is a continuation-in-part of U.S. application Ser. No. 08/840,478, filed Apr. 21, 1997, now U.S. Pat. No. 5,858,236.

BACKGROUND OF THE INVENTION

1. Field of the Invention

The invention relates to centrifuges used to remove solid particles from a fluid. More specifically, the invention relates to wringer bowl assemblies used by the centrifuges.

2. Description of the Related Art

Centrifuges are used to remove lubrication-impregnated metal chips or shavings from a lubrication liquid or fluid mixture. Common to all of the centrifuges used for this heavy duty separation procedure is the wringer bowl. The wringer bowl receives the fluid mixture. The fluid mixture then moves up the side of the wringer bowl due to the centrifugal force created by the wringer bowl as it rotates about its axis. As the fluid mixture rises, it reaches a gap in the side wall structure allowing the fluid to pass through the gap. A circular screen prevents the lubrication-impregnated metal chips or shavings from passing through the gap. These chips or shavings then move up the remaining portion of the wringer bowl and are discharged appropriately. A centrifuge and wringer bowl are disclosed in U.S. Pat. No. 5,651,881.

A significant problem with the circular screen is that portions of the circular screen wear unevenly. This, in combination with the fact that local damage destroys the effectiveness of the entire circular screen, renders the circular screen ineffective and inefficient.

SUMMARY OF THE INVENTION

Accordingly, a screening unit is disclosed to cover a hole in a side face of a wringer bowl assembly. A screening unit includes a plurality of bars having a predetermined length. A backing element extends through a curved path having a first end and a second end. These ends are spaced from each other a distance greater than the distance between any two of the plurality of bars which are adjacent each other. The plurality of bars allows the fluid in the wringer bowl to pass through while preventing the solid particulate from passing. One advantage associated with the invention is the use of a plurality of screens, each of which are individually replaceable.

BRIEF DESCRIPTION OF THE DRAWINGS

Other advantages of the present invention will be readily appreciated as the same becomes better understood by reference to the following detailed description when considered in connection with the accompanying drawings, wherein:

FIG. 1 is a perspective view of one embodiment of a wringer bowl of the prior art;

FIG. 3 is an exploded perspective view of the embodiment of FIG. 2; and

DETAILED DESCRIPTION OF THE PREFERRED EMBODIMENT(S)

Figure 2:
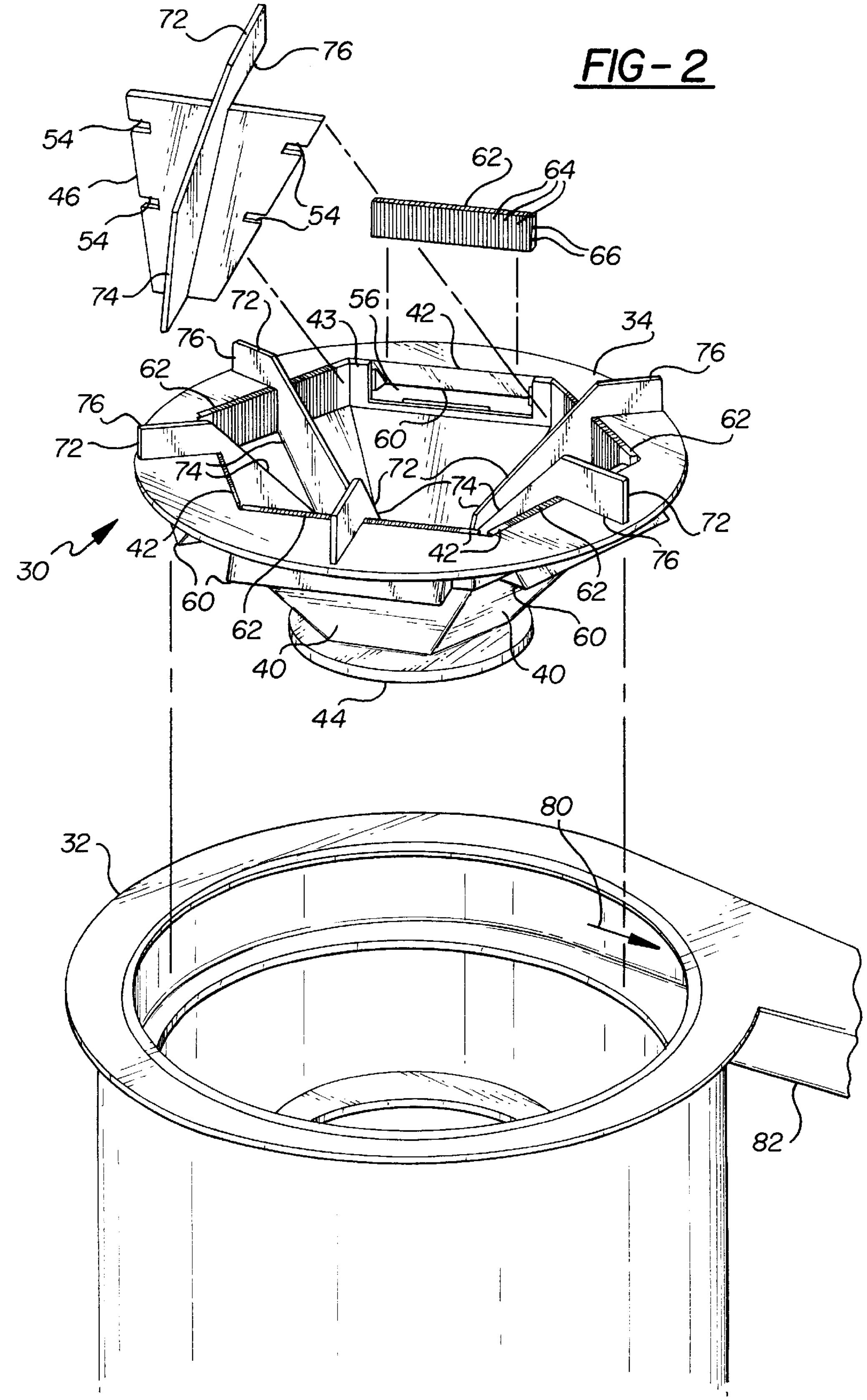
FIG. 2 is a cross-sectional side view of one alternative embodiment of a wringer assembly.

Referring to FIG. 1, a prior art wringer bowl assembly is generally indicated at 10. The prior art wringer bowl assembly 10 includes a bowl 12 and is formed from a single piece of metal having a hardness less than or equal to AR-235. The metal is formed to be a bowl of unitary structure which resembles frustum from a side view. At least one blade 14 extends along a portion of the single side wall 16 of the bowl 12. A circular screen 20, also of unitary construction, extends around the outer periphery of the bowl 12. Fluid which is dropped into the bowl 12 is pushed up through the circular screen 20. Chips and other debris (not shown) extend upwardly along a circular shoulder 22 whereafter the chips are disposed of in a manner appropriate for the environment in which the centrifuge is installed. It is the single side wall 16 of the bowl 12 which is a disadvantage to the prior art. More specifically, the single side wall 16 and bottom 24 of the bowl 12 are formed from machines which require substantial mass and size to work the metal to the final design.

Referring to FIGS. 2 and 3, an alternative embodiment of a wringer bowl assembly is shown generally at 30. The wringer bowl assembly 30 as used with a fluid recovery centrifuge 32 having a rotatable shaft (not shown) to separate the solid particulate, i.e., chips and shavings, from a fluid mixture wherein the fluid is typically a lubrication oil.

The wringer bowl assembly 30 includes a top plate 34. The top plate 34 defines a center hole through which the fluid mixture is dropped. The center hole may be a circle or, as may be appreciated when viewing the Figures, may be a multi-sided hole. Regardless of the number of sides defining the center hole of the top plate 34, the center hole and top plate 34 are symmetric about the rotatable shaft or the shaft housing 36 which receives the rotatable shaft therein.

Extending down from the top plate 34 is a plurality of side faces 40. Each of the side faces 40 are fixedly secured to the top plate 34. Further, the side faces 40 are secured to the top plate 34 in such a manner that there is no gap therebetween along any seam created at the joining surface 42 defined by the line created by the insertion of the side faces 40 and the top plate 34. In one embodiment, the plurality of side faces 40 would include two semi-circular side faces which would be mirror images of each other. In the preferred embodiment, however, there exists more than two side faces, namely six side faces, allowing for the side faces 40 to extend through a single flat plane. Because each of the side faces 40 extend in a single plane, the work required to fabricate a wringer bowl assembly 30 is almost nonexistent. More specifically, the metal used to fabricate each of the side faces 40 and the top plate 34 does not have to be bent, formed, or worked in any way to create a bend therein. Each of side faces 40 also includes an extension 43 which extends upwardly toward the top plate 34.

A base plate 44 is fixedly secured to each of the plurality of side faces 40 in a manner similar to that which secures the top plate 34 to the side faces 40. The base plate 44 includes the shaft housing 36 which is formed therein or, in an alternative embodiment, fixedly secured thereto. The base plate 44 prevents the fluid mixture from flowing therepast. The shaft housing 36 receives the rotatable shaft therein and allows the wringer bowl assembly 30 to be rotated by the rotatable shaft. The wringer bowl assembly 30 is secured to the rotatable shaft. The base plate 44, the plurality of side faces 40 and the top plate 34 are all fixedly secured to each other through welding or some other means for securing metal.

The wringer bowl assembly 30 also includes a plurality of face covers 46. Each of the face covers 46 is removably securable to each of the plurality of side faces 40. In one embodiment, the face covers 46 are secured to the side faces 40 using bolts 50 which extend out from the side faces 40 and nuts 52 which threadingly engage the bolts 50. Recesses 54 receive the bolts 50 therethrough. The recesses 54 may be holes or slots which allow the positioning of the face covers 46 on the side faces 40. The face covers 46 are removable and replaceable. Upon the wear and tear of a face cover 46 to an extent such that it is no longer operative, the face cover 46 may be replaced. The face cover 46 is a relatively inexpensive piece of equipment because it is a single sheet of metal extending in a single plane requiring minimal work to create. The face covers 46 extend over a portion of each of the plurality of side faces 40.

The side faces 40 each include an output hole 56 to allow fluid to pass therethrough. The output hole 56 extends over a portion of the side face 40 in a position adjacent the top plate 34. In one embodiment, the output hole 56 extends through the extension 43 of the side face 40.

Deflecting shields 60 deflect the fluid as it passes through the output holes 56 in an downward direction. Because the fluid is moving up the face covers 46 due to the centrifugal force created by the rotation of the wringer bowl assembly, the fluid upon reaching the output holes 56 would move out and away from the wringer bowl assembly in a direction parallel to the top plate 34. To minimize the space required to collect the fluid as it exits the wringer bowl assembly 30, the deflectors 60 force the fluid in a downwardly direction. The fluid, as opposed to the chips or shavings, is deflected in a downward direction because it is easier to change the direction of a fluid than metal chips or shavings. More specifically, the deflectors 60 have reduced wear and tear by deflecting fluid as opposed to the redirection of the chips and shavings.

Screening units 62 are used to prevent the chips and shavings from exiting the output holes 56. More specifically, each output hole 56 is covered by a screening unit 62. Because the output holes 56 extend across a flat plane so to do the screening units 62.

The screening units 62 include a plurality of bars 64 which extend along a predetermined length parallel to each other. Each of the bars 64 has a trapezoidal cross-section having first and second parallel surfaces. The first parallel surface is longer than the second parallel surface. The bars 64 are spaced equidistantly from each other such that the plurality of bars 64 allow fluid to pass therethrough and prevent the solid particulate, namely the chips and shavings, from passing therethrough. The screening unit 62 also includes a backing element 66 which extends through a single plane and fixedly secures each of the plurality of bar 64 thereto. The backing element 66 may include a single bar or a plurality of bars extending across or through the bars 64 in a direction generally perpendicular to the bars 64.

Figure 4:
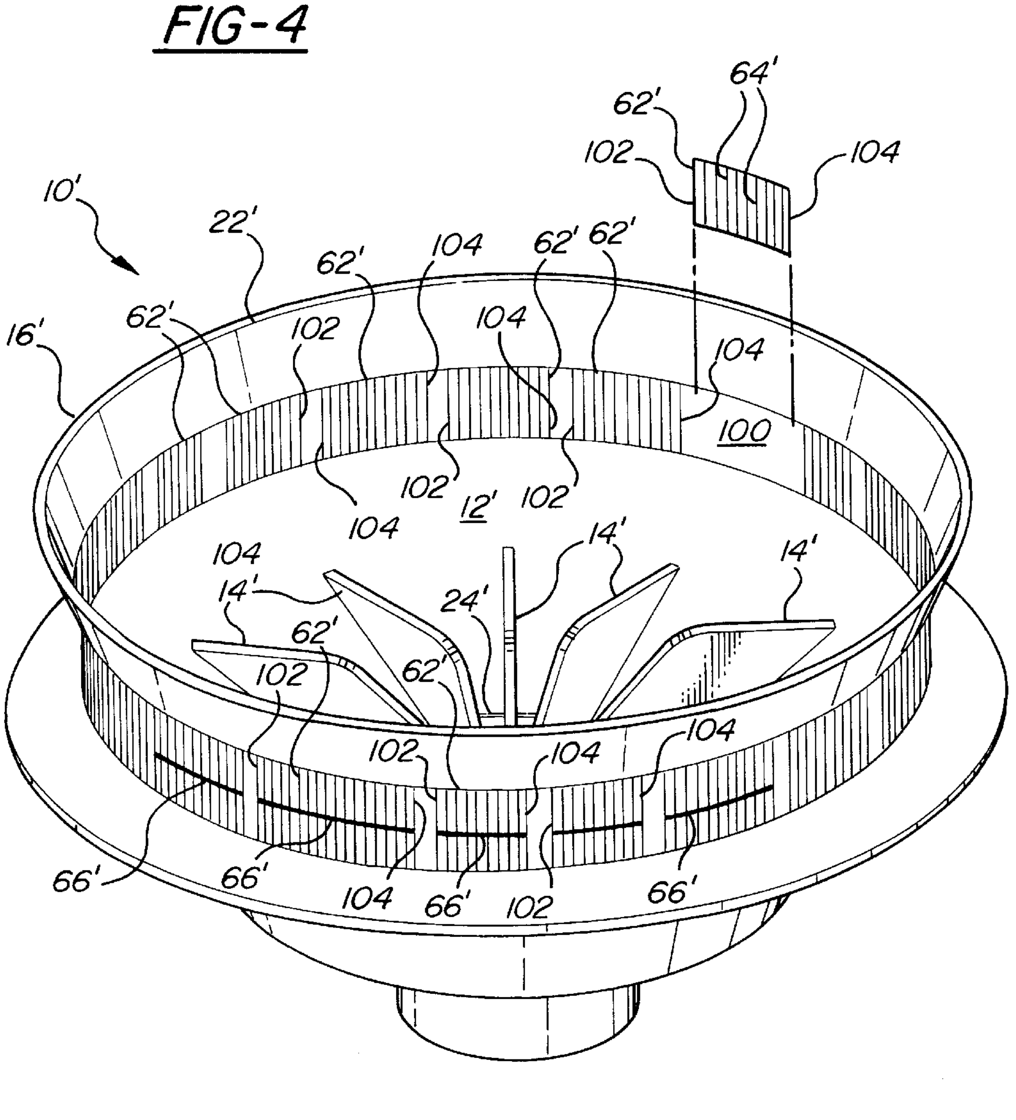
FIG. 4 is an exploded perspective view of a second alternative embodiment of the wringer bowl.

In a second embodiment shown in FIG. 4, wherein like primed numerals represent similar structure, screening units 62' are used in a wringer bowl 12'. The screening units 62' replace the circular screen 20 shown in FIG. 1. Each of the screening units 62' is used to cover a portion of the hole 100 in the side face 16' of the wringer bowl assembly 10'. Each of the screening units 62' includes a plurality of bars 64', each having a predetermined length. A backing element 66' extends through a curved path between a first end 102 and a second end 104. The first 102 and second 104 ends are spaced from each other. In the embodiment shown in FIG. 4, the screening unit 62' extends through only a portion of the circumference of the wringer bowl 10'.

Each of the face covers 46 includes a blade 72 which is fixedly secured to the face cover 46. The blade 72 extends upwardly therealong beyond the face cover 46. More specifically the blade 72 extends over the top plate 34 when the face cover 46 is secured to the side face 40. The blade 72 includes a primary arm 74 and secondary arm 76. The primary arm 74 extends up along the face cover 46. The secondary arm 76 extends along the top place 34. Therefore, the primary 74 and secondary 76 arms define and angle therebetween. The secondary arm 76 aids in the creation of air flow, generally indicated by arrow 80, to help force the chips and shavings through a dispatch housing 82 where the chips and shavings may be collected and discarded accordingly. The blade 72 extends along the longitudinal axis of the face cover 46. The blade 72 extends along the longitudinal axis, i.e., the center, to maintain equilibrium in the wringer bowl assembly 30 as it rotates. The blade 72 aid in the movement of the fluid mixture up from the base plate 44 to the subsequent separation at the output holes 56 and the eventual discharge of the chips and shavings out the discharge housing 82. In an alternative embodiment, the face covers 46 may include more than one blade 72 fixedly secured thereto in a symmetric fashion.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

I claim:

1. A screening unit to cover a hole having a width and a length in a side face of a wringer bowl assembly, said screening unit comprising:

a plurality of bars having a predetermined length equal to the width of the hole in the side face of the wringer bowl; and a backing element having a predetermined length equal to the length of the hole in the side face of the wringer bowl, said backing element extending through a curved path, said backing element having a first end and a second end spaced from said first end, said backing element secured to each of said plurality of bars to space each of said plurality of bars from each other such that said plurality of bars allows fluid to pass therethrough and prevents solid particulate from passing therethrough, said screening unit extending only through a portion of a circle.

* * * * *